(12) United States Patent
Fedyk et al.

(10) Patent No.: US 7,975,140 B2
(45) Date of Patent: Jul. 5, 2011

(54) KEY NEGOTIATION AND MANAGEMENT FOR THIRD PARTY ACCESS TO A SECURE COMMUNICATION SESSION

(75) Inventors: Donald Fedyk, Groton, MA (US); Lakshminath Dondeti, San Diego, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1491 days.

(21) Appl. No.: 11/325,818

(22) Filed: Jan. 5, 2006

(65) Prior Publication Data

US 2007/0198836 A1    Aug. 23, 2007

Related U.S. Application Data

(60) Provisional application No. 60/669,624, filed on Apr. 8, 2005.

(51) Int. Cl.
*H04L 9/14* (2006.01)
*G06F 15/16* (2006.01)
*H04L 29/06* (2006.01)

(52) U.S. Cl. ......... 713/171; 726/14; 380/279; 380/283; 713/169

(58) Field of Classification Search .......... 713/163–171; 380/255–276; 726/4, 15
See application file for complete search history.

(56) References Cited

U.S. PATENT DOCUMENTS

| | | | | |
|---|---|---|---|---|
| 6,941,457 | B1 * | 9/2005 | Gundavelli et al. | 713/163 |
| 7,127,613 | B2 * | 10/2006 | Pabla et al. | 713/171 |
| 7,234,058 | B1 * | 6/2007 | Baugher et al. | 713/163 |
| 7,310,730 | B1 * | 12/2007 | Champagne et al. | 713/163 |
| 7,395,423 | B1 * | 7/2008 | Dondeti et al. | 713/151 |
| 2003/0093669 | A1 * | 5/2003 | Morais et al. | 713/163 |
| 2003/0149874 | A1 * | 8/2003 | Balfanz et al. | 713/168 |
| 2003/0163697 | A1 * | 8/2003 | Pabla et al. | 713/171 |
| 2005/0210252 | A1 * | 9/2005 | Freeman et al. | 713/171 |
| 2006/0173940 | A1 * | 8/2006 | Guntupalli et al. | 707/206 |
| 2006/0224893 | A1 * | 10/2006 | Sales et al. | 713/171 |
| 2006/0294378 | A1 * | 12/2006 | Lumsden et al. | 713/171 |
| 2008/0313464 | A1 * | 12/2008 | Fascenda et al. | 713/171 |
| 2010/0002880 | A1 * | 1/2010 | Yoon et al. | 380/255 |
| 2010/0030982 | A1 * | 2/2010 | Sela et al. | 711/162 |
| 2010/0121934 | A1 * | 5/2010 | Guntupalli et al. | 709/207 |

* cited by examiner

*Primary Examiner* — Christopher A Revak
(74) *Attorney, Agent, or Firm* — Guerin & Rodriguez, LLP; William G. Guerin

(57) ABSTRACT

Described are a method and system for establishing a secure communication session with third-party access at a later time. A first communication subsession is established between two original devices using a first key generated by a two-party key and security association protocol. At least one of the original devices is established as a group key server. A request from a joining device to join the secure communication session is received and a second communication subsession is established between the original devices using a second key generated by the two-party key and security association protocol. The second key is provided to the joining device to enable participation in the second communication subsession.

8 Claims, 5 Drawing Sheets

KEY NEGOTIATION AND MANAGEMENT FOR THIRD PARTY ACCESS TO A SECURE COMMUNICATION SESSION

CROSS-REFERENCE TO RELATED APPLICATION

This application claims the benefit of U.S. provisional patent application Ser. No. 60/669,624, filed Apr. 8, 2005, titled "Synthesis of Key Negotiation and Management", the entirety of which provisional application is incorporated by reference herein.

FIELD OF THE INVENTION

The invention relates generally to secure communication. More particularly, the invention relates to a method and system for establishing a secure communication session with third-party access at a later time.

BACKGROUND OF THE INVENTION

Automated key negotiation is the most prevalent form of key management deployed in the Internet today. Typically, automated key negotiation employs Internet Key Exchange (IKE) (or other similar protocols) which is the key management protocol associated with the Internet Protocol Security (IPSec) standard or Secure Sockets Layer (SSL) protocol. Key distribution protocols are often used with key management through a centralized server and in group security applications.

The IKE protocol is the automated key management protocol used to establish IPsec key or Security Association (SA). The SA, or the policy and parameters governing the algorithms and processes used to protect IPsec communication, is negotiated. The key is derived from unique information or nonces shared by the two devices after mutual authentication and from Diffie-Hellman parameters as is known in the art. In some instances the two devices include a client and a server and in other instances the two devices include two peers as is shown in FIG. 1. FIG. 2 illustrates another communication environment in which a centralized server provides a key KEY 1 to each of two devices A and B for establishment of a point-to-point communication session. Generally, the key KEY 1' supplied to device A is different than the key KEY 1" supplied to device B.

Using contributory key establishment protocols such as those described above, both devices contribute secret data for computation of the data protection keys. As an example in which a device A wants to establish a secure communication session with each of devices B and C, device A supplies one value to device B and a different value to device C. Devices B and C each contribute a different value and therefore the security key resulting from the applied protocol for the communication between devices A and B is different from the security key generated for communication between devices A and C. Even if device A supplied the same value to device B and device C, the security key for communication between device A and device B would be different than the security key for communication between device A and device C.

Other secure communication configurations such as a center facilitated two-party secure communication, a one-to-many secure communication or a many-to-many secure communication require that a single SA and keys be downloaded to two or more devices. The SSL and IKE protocols described above do not accommodate such configurations. Instead, other protocols such as Group Domain of Interpretation (GDOI) and Multimedia Internet Keying (MIKEY) protocols are often used. The GDOI and MIKEY protocols use a trusted third party or an asymmetric server-client relationship for key establishment. The client contacts the server for keys and, after mutual authentication, the server unilaterally determines the security policy and sends the keys. In some instances multi-party negotiation does not converge or may not otherwise be practical for establishing a secure communication. The client is not involved in determining the security parameters of the current connection. In some instances the client may reject the policy and keys, and abstain from participating in the secure communication.

What is needed is a method for key negotiation and key distribution that avoids the above-described problems. The present invention satisfies this need and provides additional advantages.

SUMMARY OF THE INVENTION

In one aspect, the invention features a method for establishing a secure communication session with third-party access at a later time. A first communication subsession is established between two original devices using a first key generated by a two-party key and security association protocol. One of the original devices is established as a group key server. A request from a joining device to join the secure communication session is received and a second communication subsession is established between the original devices using a second key generated by the two-party key and security association protocol. The second key is provided to the joining device to enable participation in the second communication subsession.

In another aspect, the invention features a method for establishing a secure communication session with third-party access at a later time. A first communication subsession is established between a first original device and a second original device using a first key generated by a two-party key and security association protocol. The first original device receives a request to join the secure communication session from a first joining device and the second original device receives a request to join the secure communication session from a second joining device. Credentials of the first and second joining devices are verified for authorization to join the secure communication session. A second communication subsession between the first and second original devices is established using a second key generated by the two-party key and security association protocol. The first original device and the second original device download the second key to the first joining device and the second joining device, respectively, to enable participation by the first and second joining devices in the second communication subsession.

In yet another aspect, the invention features a system for establishing a secure communication session enabling third-party access at a later time. The system includes a first original device and a second original device each configured to establish a first communication subsession with the other original device using a first key generated by a two-party key and security association protocol. The first original device is adapted to receive a request to participate in the secure communication session from a joining device and to generate and download a group key for a second communication subsession to the joining device in response thereto.

BRIEF DESCRIPTION OF THE DRAWINGS

The above and further advantages of this invention may be better understood by referring to the following description in conjunction with the accompanying drawings, in which like numerals indicate like structural elements and features in the various figures. For clarity, not every element may be labeled in every figure. The drawings are not necessarily to scale, emphasis instead being placed upon illustrating the principles of the invention.

DETAILED DESCRIPTION

In brief overview, the invention relates to a method for establishing a secure communication session with third-party access at a later time. The method allows two devices to maintain an existing key establishment channel in a point-to-point manner without interruption while allowing other devices to join a secure communication session. As used herein, a device means any telecommunication device capable of transmitting and receiving communications data to and from one or more other telecommunication devices. For example, a device can be a personal computer, laptop computer, cellular phone, video phone, personal digital assistant and the like. At least one of the devices is capable of performing as a group server for distribution of a group key.

The method is seamless; there is no requirement to "teardown" the pre-existing secure session and to re-establish a new secure connection between the original devices. Moreover, the ability in some instances to have each of the original devices perform as a group server improves efficiency in comparison to a single group server configuration. In particular, distribution of key resources is improved, especially for large groups where "keying" is a function of membership. Advantageously, the method enables the coordination of download-based key distribution with contributory key establishment devices and provides seamless expansion of security from a unicast secure session to a multicast secure session. The method is particularly beneficial to conferencing sessions and other applications in which multicast communication is utilized. The method also accommodates devices that are only capable of point-to-point secure communication.

Figure 1:
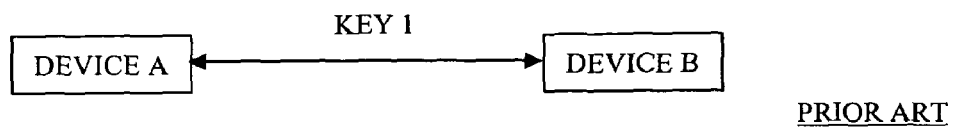
FIG. 1 illustrates a point-to-point communication environment for secure communication between two devices as is known in the art.
Figure 2:
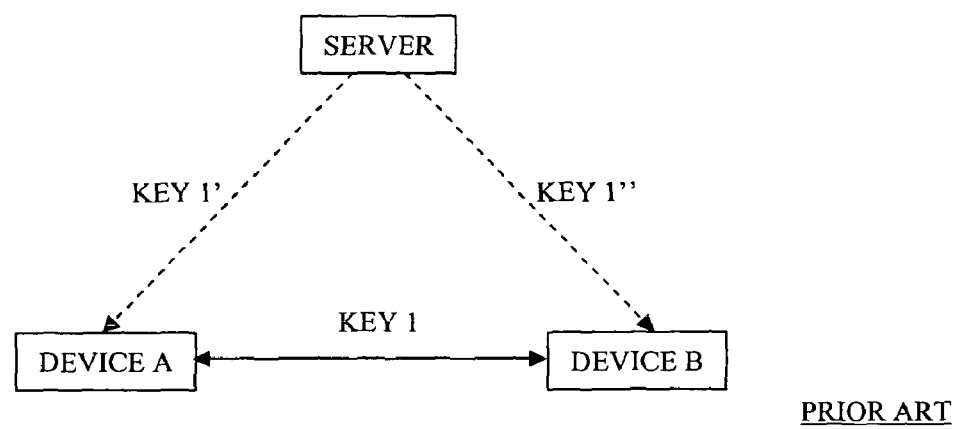
FIG. 2 illustrates a point-to-point communication environment in which key distribution is facilitated by a centralized server to enable secure communication between two devices as is known in the art.
Figure 3A:
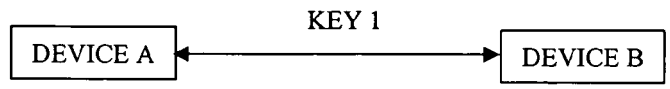
FIGS. 3A to 3D depict a communication environment over time in which a two-party secure communication session is expanded to accommodate new session participants according to principles of the invention.
Figure 3B:
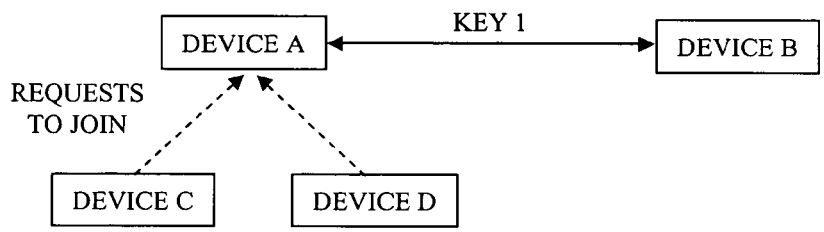

Voice communication, video communication, video distribution (e.g., online meeting video conferencing) and chat services are examples of applications in which a secure communication session can be established between two devices. One or more additional devices may desire to join the secure communication session at a later time. FIGS. 3A to 3D depict over time a communication environment in which a two-party secure communication session is expanded to accommodate new session participants in accordance with the invention. FIG. 4 is a flowchart representation of an embodiment of a method 100 for establishing a secure communication session with third-party access at a later time according to the invention. The two-party secure communication session shown in FIG. 3A is established (step 110) using Secure Sockets Layer (SSL), Internet Key Exchange (IKE) or another two-party key and Security Association (SA) negotiation protocol and a key (KEY 1) is shared between original device A and original device B. At a later time, joining devices C and D request (step 120) to participate in the session as shown in FIG. 3B. Original devices A and B then establish (step 130) which original device will perform as a group key server and the selected original device runs GDOI, MIKEY, Group Secure Association Key Management Protocol (GSAKMP) or another proprietary or standards-based protocol to enable a security policy and keys be downloaded to the new session participants (joining devices C and D).

Figure 3C:
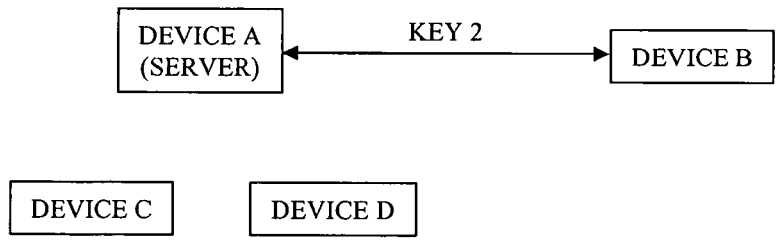
Figure 4:
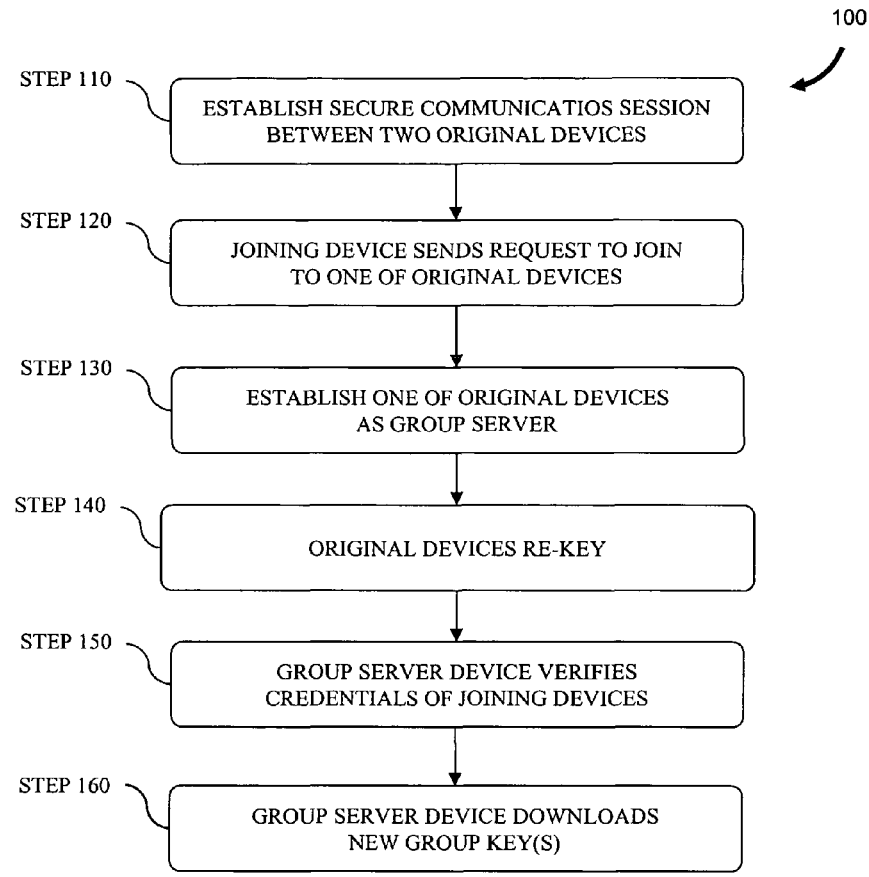
FIG. 4 is a flowchart representation of an embodiment of a method for establishing a secure communication session with third-party access at a later time in accordance with the invention.

Before initiating the group security protocol, original devices A and B re-key (step 140) as shown in FIG. 3C before providing the new key (KEY 2). As illustrated the new key is different for each joining device (i.e., KEY $2_C$ is different from KEY $2_D$) and the distinction is managed by device A. In an alternative embodiment, the new key supplied to each device is the same key. The generation of the new key (KEY 2) ensures that past communications between original devices A and B cannot be decrypted by joining devices C and D. Without the re-keying procedure, joining devices C and D can record the prior encrypted communications between original devices A and B, join the session when allowed by device A or device B, and use the original key (i.e., KEY 1) to decrypt the recorded communications, thereby providing access to information which may be confidential and may not be intended for the joining devices C and D.

Figure 3D:
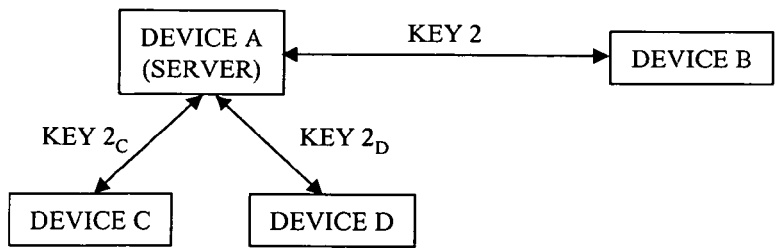

The joining devices C and D are expected to run the group key protocol utilized by the group key server. The group key server verifies (step 150) the credentials of the joining devices and downloads (step 160) the new group key. Credentials used for authentication and authorization can include a password or a certificate as known in the art. Potentially other supporting keys required by a particular group key distribution protocol are also downloaded. Subsequent secure communication between all participating devices is shown in FIG. 3D and can be realized using a multicast communication environment or a multicast/unicast communication environment.

In an alternative embodiment, one of the original devices A and B allows a joining device C or D to join the secure communication session. The joining device C or D can understand that it is part of a group; however, the original device A or B can continue to operate in a single (i.e., point-to-point) mode using the original key KEY 1 or the new key KEY 2.

In the embodiment described according to FIG. 3, two devices C and D are shown to join the session. It should be recognized that the invention contemplates any number of devices joining a pre-established secure communication session.

Figure 5:
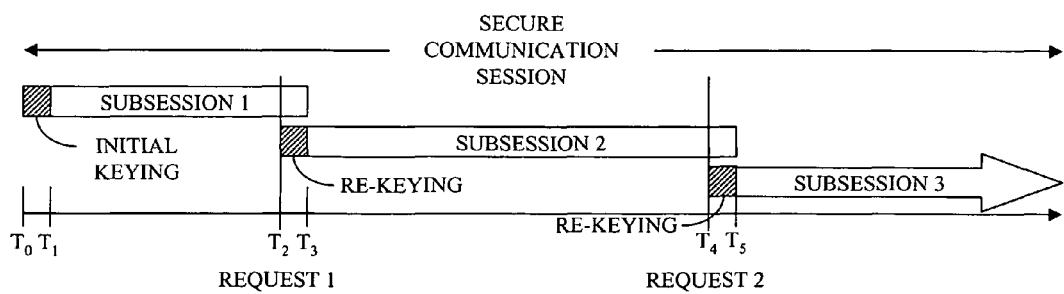
FIG. 5 graphically depicts a timeline for a single secure communication session accessible to new participants during a secure communication session according to principles of the invention.

Joining devices can request to join the session at different times. Referring to FIG. 5 for an example, a timeline for a single secure communication session is shown. At time $T_0$, two original devices initiate a point-to-point secure communication session and begin transmitting and receiving data at time $T_1$ after a key is established. At time $T_2$ a joining device requests to participate in the secure communication session. The original device that is acting as a group server then verifies the credentials of the joining device and the original devices re-key before downloading at time $T_3$ a group key defined according to the current group key distribution protocol. Due to the re-keying, any data transmitted during subsession 1 cannot be decrypted by the joining device that starts its participation during subsession 2. At time $T_4$ another joining device requests to participate in the secure communication session. After verification, re-keying and subsequent downloading of a new group key by time $T_5$, all four devices participate during subsession 3. Due to the second re-keying between times $T_4$ and $T_5$, the joining device first participating during subsession 3 cannot decrypt any encrypted communications transmitted during subsession 1 and subsession 2.

Figure 6A:
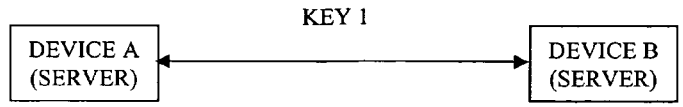
FIGS. 6A to 6D depict another communication environment over time in which a two-party secure communication session is expanded to accommodate new session participants according to principles of the invention.
Figure 6B:
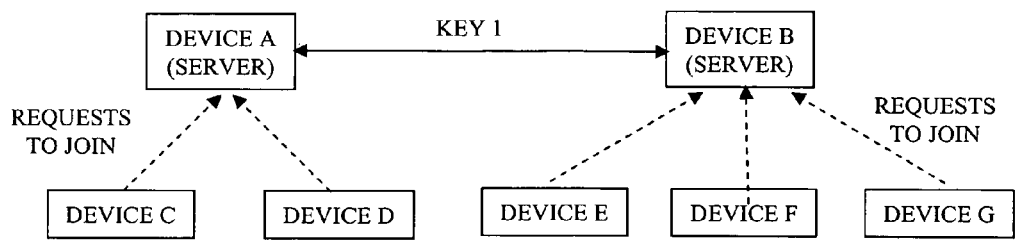
Figure 6C:
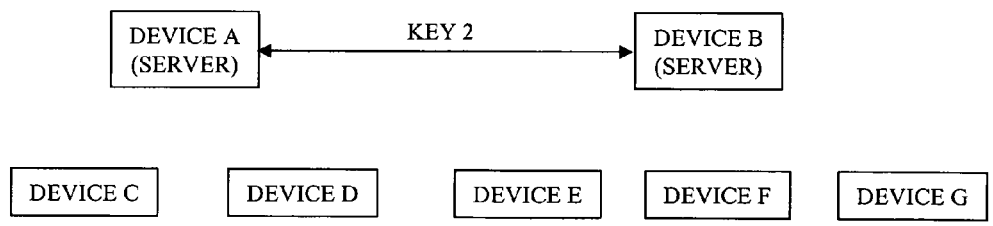
Figure 6D:
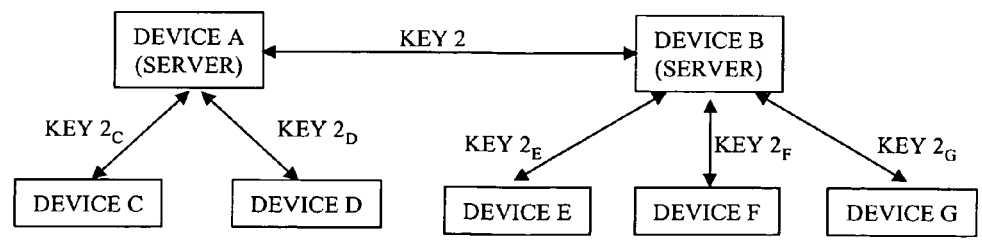
Figure 7:
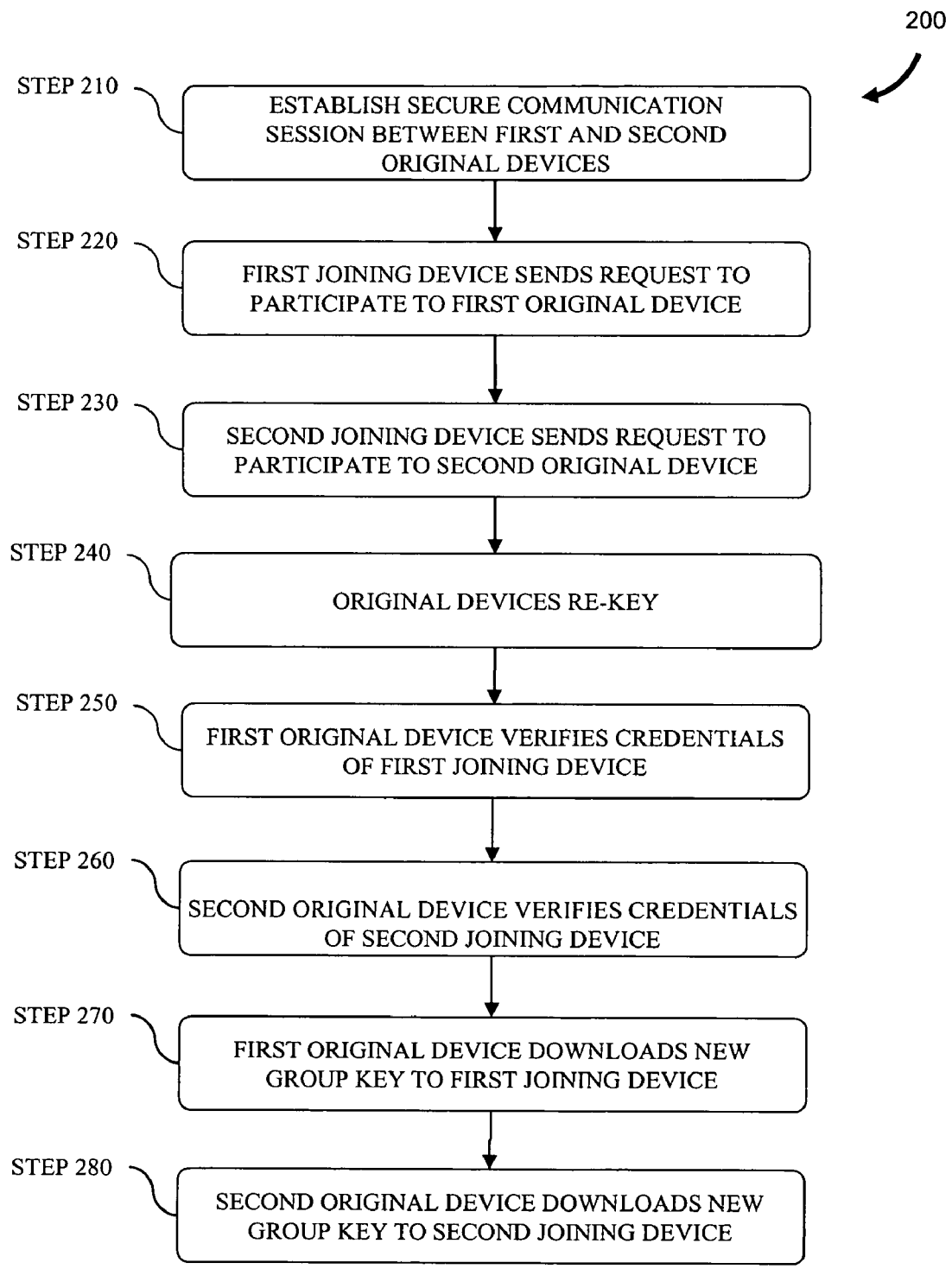
FIG. 7 is a flowchart representation of another embodiment of a method for establishing a secure communication session with third-party access at a later time in accordance with the invention.

FIGS. 6A to 6D illustrate over time another communication environment in which a two-party secure communication session is expanded to accommodate new session participants. FIG. 7 is a flowchart representation of another embodiment of a method 200 for establishing a secure communication session with third-party access at a later time according to the invention. In this embodiment each of the two original devices A and B performs as a group server. A two-party secure communication session is established (step 210) between original devices A and B as shown in FIG. 6A according to a two-party key and SA negotiation protocol and a key (KEY 1) is shared. At later times, joining devices C and D send (step 220) requests to participate to original device A, and joining devices E, F and G send (step 230) requests to participate to original device B as shown in FIG. 6B. Original devices A and B then synchronize with each other by re-keying (step 240) in a point-to-point protocol as shown in FIG. 6C. Re-keying preserves the privacy of prior communications as described above. Each original device then verifies (steps 250 and 260) the credentials of each of its joining devices requesting access to the secure communication session. Subsequently, original device A downloads (step 270) the newly generated group key (KEY 2) to its joining devices C and D. Similarly, original device B downloads (step 280) the group key (KEY 2) to its joining devices D, E and F. As shown, the group key (KEY $2_C$ to KEY $2_G$) for the new subsession is different for each member of the group with each group server managing the separate form of each group key for its members. Alternatively, the group key for the new subsession provided to each member of the group can be the same key.

Although FIG. 6 depicts a situation in which each original device A and B receives simultaneous requests for participation, it should be recognized that the principles of the invention also apply when the requests for participation occur at different times. Moreover, there can be more than two group servers. Re-keying can occur between all the group servers but does not necessarily have to occur at the same time as the previous key is still valid while the new key is distributed. In addition, a joining device can start participation in the secure session through one of the servers at a different time than another joining device participating through a different server without requiring a re-keying, especially if the start of participation differs by no more than a few seconds.

While the invention has been shown and described with reference to specific embodiments, it should be understood by those skilled in the art that various changes in form and detail may be made therein without departing from the spirit and scope of the invention.

What is claimed is:

1. A method for establishing a secure communication session with third-party access at a later time, the method comprising:
    establishing a first communication subsession between two original devices using a first key generated by a two-party key and security association protocol;
    establishing one of the original devices as a group key server;
    receiving a request from a joining device to join the secure communication session;
    after receiving the request, establishing a second communication subsession between the original devices using a second key generated by the two-party key and security association protocol; and
    providing the second key to the joining device to enable participation in the second communication subsession.

2. The method of claim 1 further comprising verifying credentials of the joining device for authorization to join the secure communication session prior to establishing the second communication subsession.

3. The method of claim 1 wherein the two-party key and security association protocol comprises a SSL protocol.

4. The method of claim 1 wherein the two-party key and security association protocol comprises an IKE protocol.

5. The method of claim 1 wherein establishing one of the original devices as a group key server comprises executing a group key distribution protocol.

6. The method of claim 5 wherein the group key distribution protocol comprises one of a GDOI protocol, MIKEY protocol and GSAKMP protocol.

7. A system for establishing a secure communication session enabling third-party access at a later time, the system comprising a first original device and a second original device each configured to establish a first communication subsession with the other original device using a first key generated by a two-party key and security association protocol, the first original device adapted to receive a request to participate in the secure communication session from a joining device and to generate and download a group key for a second communication subsession to the joining device in response thereto wherein the first communication subsession between the first and second original devices is terminated and a second communication subsession between the first and second original devices is established, and the second original device having a group authorization module adapted to receive a request to participate in a secure communication session from a second joining device and to provide a second group key for a third communication subsession wherein the second communication subsession between the first and second original devices is terminated and a third communication subsession between the first and second original devices is established.

8. The system of claim 7 further comprising a joining device in communication with the first original device and adapted for participation in the second communication subsession using the group key.

* * * * *